Jan. 9, 1945.  J. VEIT  2,366,944
MANUFACTURE OF INSULATED CONDUCTORS OR OTHER COATED BODIES
Filed Jan. 6, 1943
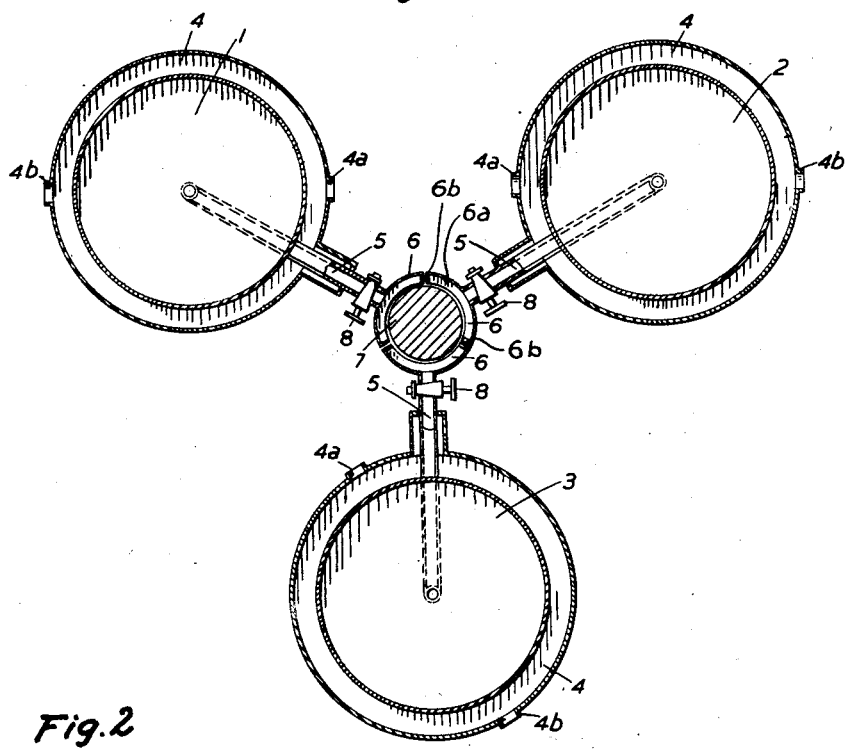
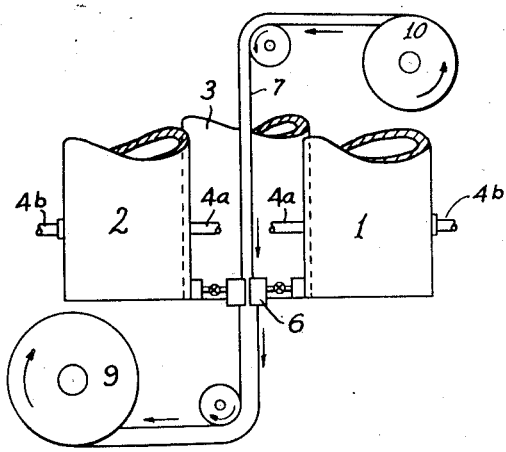
Inventor
JULIUS VEIT
By *Whittemore Hulbert & Belknap*
Attorneys Patented Jan. 9, 1945

2,366,944

UNITED STATES PATENT OFFICE 2,366,944

MANUFACTURE OF INSULATED CONDUCTORS OR OTHER COATED BODIES

Julius Veit, Hounslow West, England

Application January 6, 1943, Serial No. 471,486
In Great Britain March 25, 1941

5 Claims. (Cl. 117—43)

This invention relates to the manufacture of insulated conductors or other coated bodies.

Conductors—e. g., wires—(hereinafter referred to as wires) are covered with multicolored insulation in different combinations of colors for the purpose of identification. Hitherto such insulated wires have been made by first producing multicolored sleevings, which may be made of thermoplastic materials—i. e., cellulose acetate, polyvinyl chloride, polyisobutylene, polyethylene (for example, the product known by the trade name "Polythene"), the material known by the trade name "Nylon" and mixtures of these materials, and then inserting the wire in these sleevings. Insulated wire made in this way is necessarily limited in length, it being impracticable to produce very great lengths of insulated wire by that method.

According to the invention, any desired length of wire or collection of wires or other body or collection of other bodies (hereinafter referred to as wire) covered with a multicolored insulation or coating (hereinafter referred to as coating) can be obtained by causing the wire to travel longitudinally and applying two or more differently colored streams of thermoplastic material to the surface of the moving wire, the said differently colored streams being of such widths and arranged in such a manner as to produce a complete coating round the wire, which coating will exhibit continuous stripes or continuous longitudinal portions of the different colors. Thus, the wire may be caused to pass through a die and covered with the thermoplastic material in one operation.

The differently colored thermoplastic materials may be filled in the molten state into separate feeding chambers from which they issue or are caused to issue through suitable apertures, the arrangement being such that the issuing streams of differently colored thermoplastic material produce a complete coating round the wire, which coating will exhibit continuous stripes or continuous longitudinal portions of the different colors.

An apparatus suitable for use in covering a wire with a three-colored coating is represented diagrammatically and by way of example by the accompanying drawing which shows in Figure 1 the apparatus in cross-sectional plan, Figure 2 being a rear elevation of Figure 1 and showing the wire feeding means.

Thermoplastic material in three different colors—e. g., red, yellow and blue—is filled in the molten state into three separate feeding chambers 1, 2 and 3 respectively each of which is provided with means—e. g., a steam or hot-water jacket 4—for keeping the thermoplastic material sufficiently fluid. 4a and 4b are respectively the inlets and outlets for the steam or hot water. The three streams of thermoplastic material issue by gravity through tubes 5 communicating with the bottoms of the chambers and pass through outlets 6 on to the wire 7 which is presumed to be moving perpendicularly to the plane of the paper—i. e., longitudinally of itself. Cocks 8 serve to regulate the flow of thermoplastic material and to shut off the flow when the feeding is to be stopped. The outlets 6 are of such sizes and arranged so close together that the issuing streams will produce a complete coating round the wire. The coating will exhibit continuous longitudinal stripes of the three different colors.

The outlets 6 are so shaped and related as to combine to form a cylindrical sleeve concentrically surrounding the wire 7, the axial dimension of such sleeve being at least equal to the diameter of one of the tubes 5. Each outlet is of part annular cross-section in the plane containing the axes of the tubes 5 as shown in Figure 1 of the drawing and is formed with arcuate upper and lower horizontal flanges 6a (only the lower flanges being shown) and vertical flanges 6b which are radial in relation to the axis of the wire 7, the vertical flanges of successive part annular outlet 6 abutting against each other or being only very narrowly spaced. The inner edges of the flanges 6a and 6b form the perimeters of the mouths of the outlets 6, and with normal flow of the thermoplastic material from such mouths, the thermoplastic material will ooze smoothly on to the travelling wire and will have sufficient lateral spread to ensure that there are no uncoated lines of demarcation of the distinctively coloured ribbons of thermoplastic material upon the wire.

The wire 7 is wound on to a take-up spool or pulley 9 from a supply spool 10 in well-known manner after it has travelled a sufficient distance from the coating device to enable the thermoplastic material to harden in a film-like or ribbon-like coating.

What I claim is:

1. A continuous process for coating wire with distinctively coloured ribbons of thermoplastic material consisting in feeding the wire axially, extruding directly on to the travelling wire distinctively coloured streams of molten thermoplastic material supplied from various sources of supply each containing a distinctively coloured molten mass of the material, and confining the flow of thermoplastic material into parallel ribbon-like streams of such widths and arranged in such manner as to form a multi-coloured complete coating for the wire.

2. A continuous process for coating wire with distinctively coloured ribbons of thermoplastic material consisting in feeding the wire axially, extruding directly by gravity on to the travelling wire distinctively coloured streams of molten thermoplastic material supplied from various sources of supply each containing a distinctively coloured molten mass of the material, and confining the flow of thermoplastic material into parallel ribbon-like streams of such widths and arranged in such manner as to form a multi-coloured complete coating for the wire.

3. A method of coating wire with distinctively coloured ribbons of thermoplastic material consisting in feeding the wire axially through an applicator, supplying distinctively coloured masses of molten thermoplastic coating material to the applicator from separate sources each containing a supply of distinctively coloured molten thermoplastic material and spreading the thermoplastic coating material on to the wire in distinctively coloured ribbons of such widths and arranged in such manner as to completely coat the wire by extruding the distinctively colored masses of molten thermoplastic material from the applicator directly on to the axially travelling wire.

4. A method of coating wire with distinctively coloured ribbons of thermoplastic material consisting in feeding the wire axially and vertically through an applicator, supplying distinctively coloured masses of molten thermoplastic coating material to the applicator from separate sources each containing a supply of distinctively coloured molten thermoplastic material and spreading the thermoplastic coating material on to the wire in distinctively coloured ribbons by extruding the distinctively coloured masses of molten thermoplastic material by gravity from the applicator directly on to the axially travelling wire in distinctively coloured parallel ribbons.

5. A method of coating wire consisting in feeding the wire axially, and meanwhile extruding directly on to different areas of the same face of the wire streams of different molten thermoplastic material of such widths and so arranged as to produce a complete coating around the wire.

JULIUS VEIT.